(12) United States Patent
Podpaly et al.

(10) Patent No.: US 11,867,866 B2
(45) Date of Patent: Jan. 9, 2024

(54) SYSTEM AND METHOD FOR FISSIONABLE MATERIAL DETECTION WITH A SHORT PULSE NEUTRON SOURCE

(71) Applicant: Lawrence Livermore National Security, LLC, Livermore, CA (US)

(72) Inventors: Yuri Podpaly, Hayward, CA (US); James M. Hall, Livermore, CA (US); Alexander Peter Povilus, Livermore, CA (US); Andrea Schmidt, Livermore, CA (US); Dustin Yang, Atlanta, GA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 269 days.

(21) Appl. No.: 16/532,707

(22) Filed: Aug. 6, 2019

(65) Prior Publication Data
US 2020/0041685 A1 Feb. 6, 2020

Related U.S. Application Data

(63) Continuation-in-part of application No. PCT/US2018/055050, filed on Oct. 9, 2018.
(Continued)

(51) Int. Cl.
*G21G 4/02* (2006.01)
*G01V 5/00* (2006.01)
(Continued)

(52) U.S. Cl.
CPC ......... *G01V 5/0091* (2013.01); *G01N 23/222* (2013.01); *G01T 3/06* (2013.01);
(Continued)

(58) Field of Classification Search
CPC ...... G01V 5/0091; G01V 5/0016; G21B 1/03; G21G 4/02; G01N 23/222; G01T 3/06
See application file for complete search history.

(56) References Cited

U.S. PATENT DOCUMENTS 4,580,056 A * 4/1986 Kaiser ............... G01T 3/00
376/257
7,151,815 B2 * 12/2006 Ruddy ............... G01V 5/0091
376/180
(Continued)

FOREIGN PATENT DOCUMENTS

WO WO-2013068032 A1 5/2013
WO WO-2016196799 A1 12/2016

OTHER PUBLICATIONS

Krishnan, Mahadevan, et al. "A Fast Pulsed Neutron Source for Time-of-Flight Detection of Nuclear Materials and Explosives." AIP Conference Proceedings. vol. 1412. No. 1. American Institute of Physics, 2011. (Year: 2011).*
(Continued)

*Primary Examiner* — Lily C Garner
(74) *Attorney, Agent, or Firm* — HARNESS, DICKEY & PIERCE, P.L.C.

(57) ABSTRACT

A system and method is disclosed for detecting fissionable materials. In one embodiment the system may incorporate a neutron pulse generator configured to generate multiple short pulses of neutrons, or a single pulse of sufficient intensity, in a vicinity of an object of interest. The source pulse of neutrons includes neutrons which each have a full width half maximum time duration of less than about 100 ns and a peak energy level no greater than about 20 MeV. A fast response detector is used which is able to detect single neutron events indicative of fission neutrons having been produced by the source pulse of neutrons interacting with fissionable material associated with the object of interest,
(Continued)

and which arrive at the fast response detector within a predetermined time window immediately before arrival of the source neutron pulses.

11 Claims, 5 Drawing Sheets

Related U.S. Application Data

(60) Provisional application No. 62/714,932, filed on Aug. 6, 2018.

(51) Int. Cl.
  *G01N 23/222* (2006.01)
  *G01T 3/06* (2006.01)
  *G21B 1/03* (2006.01)

(52) U.S. Cl.
  CPC .............. *G01V 5/0016* (2013.01); *G21B 1/03* (2013.01); *G21G 4/02* (2013.01)

(56) References Cited

U.S. PATENT DOCUMENTS

| | | | | |
|---|---|---|---|---|
| 8,345,812 | B2* | 1/2013 | Perticone | G01V 5/0091 376/153 |
| 9,477,005 | B2* | 10/2016 | Chandrasekharan | G01V 5/0091 |
| 10,123,405 | B2* | 11/2018 | Radel | H05H 3/06 |
| 10,416,318 | B1* | 9/2019 | Newman | G01V 5/0075 |
| 2005/0220247 | A1* | 10/2005 | Ruddy | G01V 5/0091 376/159 |
| 2009/0175401 | A1 | 7/2009 | Bertozzi et al. | |
| 2010/0046690 | A1* | 2/2010 | Proctor | G01V 5/0091 376/154 |
| 2012/0037812 | A1* | 2/2012 | Norris | G01T 3/00 250/393 |
| 2012/0155592 | A1 | 6/2012 | Gozani et al. | |
| 2012/0314827 | A1 | 12/2012 | Dioszegi et al. | |
| 2014/0270034 | A1* | 9/2014 | Clayton | G01V 5/0091 376/154 |
| 2015/0323473 | A1* | 11/2015 | Mitra | G01V 5/0091 250/390.04 |
| 2018/0188395 | A1 | 7/2018 | Rowland et al. | |

OTHER PUBLICATIONS

Gribkov, V., et al. "A single-shot nanosecond neutron pulsed technique for the detection of fissile materials." Journal of Instrumentation 7.07 (2012): C07005.*

Yang, D., et al. Active Interrogation with a Short-Pulse Neutron Source. No. LLNL-TR-659177. Lawrence Livermore National Lab. (LLNL), Livermore, CA (United States), 2014.*

Di Fulvio, A., et al. "Fast multiplicity counter featuring stilbene detectors for special nuclear material assay." 2015 IEEE Nuclear Science Symposium and Medical Imaging Conference (NSS/MIC). IEEE, 2015.*

Podpaly, Y. A., et al. Environment insensitive detection of fissionable material with a short pulse neutron source. No. LLNL-CONF-759814. Lawrence Livermore National Lab.(LLNL), Livermore, CA (United States), 2018.*

Yang, D., McAlpine, S., Mozin, V. and Schmidt, A. "Active Interrogation with a Short-Pulse Neutron Source", No. LLNL-TR-659177, Lawrence Livermore National Lab (LLNL), Livermore, CA (United States), Aug. 18, 2014.

International Search Report and Written Opinion for PCT/US2018/055050 dated May 21, 2019.

Tomar, B.S., et al. "Non-Destructive Assay of Fissile Materials through Active Neutron Interrogation Technique Using Pulsed Neutron (Plasma Focus) Device." *Nuclear Instruments and Methods in Physics Research Section A: Accelerators, Spectrometers, Detectors and Associated Equipment*, vol. 703, 2013, pp. 11-15.

Yang, D., et al. "Active Interrogation with a Short-Pulse Neutron Source", LLNL-POST-658136, Lawrence Livermore National Lab.

Chichester, D. L. et al. "Active Neutron Interrogation to Detect Shielded Fissionable Material", Idaho National Laboratory.

Gribkov, V. A., et al. "A dense plasma focus-based neutron source for a single-shot detection of illicit materials and explosives by a nanosecond neutron pulse." Physica Scripta 81.3 (2010): 035502, IOP Publishing, pp. 1-12.

Gribkov, V., et al. "A single-shot nanosecond neutron pulsed technique for the detection of fissile materials." Journal of Instrumentation 7.07 (2012): C07005, IOP Publishing Ltd and Sissa Medialab, pp. 1-21.

Miklaszewski, R. et al. "Detection of explosives and other illicit materials by a single nanosecond neutron pulses—Monte Carlo simulation of the detection process", *Journal of Instrumentation, Institute Of Physics Publishing*, Bristol, GB, vol. 7, No. 7, Jul. 16, 2012 (Jul. 16, 2012), p. C07006, XP020226619, ISSN: 1748-0221, DOI: 10.1088/1748-0221/7/07/C07006.

Paff, Marc G. et al. "Fast and thermal neutron detectors for radiation portal monitors", 2017 IEEE Nuclear Science Symposium and Medical Imaging Conference (NSS/MIC), IEEE, Oct. 21, 2017 (Oct. 21, 2017), pp. 1-2, XP033445907, DOI: 10.1109/NSSMIC.2017.8532639 [retrieved on Nov. 12, 2018].

Supplementary European Search Report for corresponding Application No. EP18929407 dated Dec. 21, 2021.

* cited by examiner

SYSTEM AND METHOD FOR FISSIONABLE MATERIAL DETECTION WITH A SHORT PULSE NEUTRON SOURCE

CROSS-REFERENCE TO RELATED APPLICATIONS

This application is continuation-in-part of PCT International Application No. PCT/US2018/055050 filed on Oct. 9, 2018, which claims the benefit of U.S. Provisional Application No. 62/714,932 filed on Aug. 6, 2018. The entire disclosures of each of the above applications are incorporated herein by reference.

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to systems and methods for detecting fissionable material, and more particularly to a system and method for interrogating objects of interest remotely, using short duration, high intensity neutron pulses and fast response detectors, to detect whether the object of interest contains fissionable material.

BACKGROUND

This section provides background information related to the present disclosure which is not necessarily prior art.

Emergency response and search applications often require on-site, unambiguous, and quick identification of objects of interest to determine if they contain fissionable material. Accordingly, remote detection of fissionable material, particularly when such material is shielded, is a problem of significant national security interest.

Remote detection of fissionable material is currently performed primarily either by passive means (e.g., gamma ray spectroscopy) or by active means. Active detection often requires knowledge of the surrounding environment, as, for example, differential die away from neutron interrogation would. Being able to quickly and unambiguously detect fissionable material in the field will greatly simplify shipboard search, emergency response, and portal scanning applications.

Currently used and proposed methods for fissionable material detection involve Passive Gamma Ray Spectroscopy, Differential Die-Away, Gamma Induced Neutron Analysis and Neutron Induced Gamma Analysis. Passive Gamma Ray Spectroscopy involves using a detector to identify the passively emitted gamma rays from fissionable materials. This method requires detectors to be deployed and does not require any active sources with the potential for harm to operators. This method, however, is often time consuming, cannot detect less active fissionable materials, such as highly enriched uranium, and can be defeated by shielding radioactive materials.

Differential Die-Away (neutron induced neutron analysis) involves using a pulsed electronic neutron source to interrogate an object of interest. The fall-off of the neutron signal when the device is turned off, is sensitive to the presence of fissionable material in the object of interest. This method is harder to shield than most gamma analysis regimes; however, interpretation of the data is dependent on the shape of the object and the surrounding environment. Accordingly, this method works better when these factors can be controlled, such as in cargo container inspection. At the present time, it is believed that differential die-away analysis has only been fielded in highly controlled laboratory settings.

Gamma induced neutron analysis involves using a fast photon source to induce (gamma, n) reactions in the object/material of interest. Neutrons are then measured by a neutron sensitive detector. This method has the advantage of gamma sources being easier to turn on and off than neutron sources, and short-pulses increasing the signal above the background. However, this method is expected to require significant research and development to make a rapidly-pulsed multi-pulse device. Additionally, the footprint of a fast photon source is typically quite large. At the present time, the most compact fast photon source would need to be transported on a large semi-truck.

Neutron induced gamma analysis involves the use of a neutron source which is used to interrogate an object, followed by gamma spectroscopy. This methodology solves the quiescent object problem in passive gamma ray spectroscopy, but it is still possible to shield the gamma signal with dense material.

In view of the foregoing, it will be appreciated that systems and methods are needed for reliably and unambiguously detecting the presence of fissionable material within, at or on an object of interest, and without the need for detailed information on other materials that may be in a vicinity of the object of interest, or advanced knowledge and consideration of the density of other objects in the vicinity of the object of interest, or the locations of such other objects or surfaces, or the geometry of the object of interest or the room in which it may be present. A further important consideration is in presenting a system that is of relatively compact dimensions, and relatively low in weight and power requirements, and which can be easily transported to sites where needed, and which is capable of detecting fissionable materials including shielded special nuclear materials (SNM), for various security and/or monitoring tasks.

SUMMARY

In one aspect the present disclosure relates to a system for detecting fissionable materials. The system may comprise a neutron pulse generator configured to generate multiple short pulses of neutrons, or a single pulse of sufficient intensity, in a vicinity of an object of interest. The source pulse of neutrons includes neutrons which each have a full width half maximum time duration of less than about 100 ns and a peak energy level no greater than about 20 MeV (e.g., the vast majority of the neutrons have energy below 20 MeV). A fast response detector may be included which is sensitive enough to detect single neutron events. Such events would be indicative of fission neutrons having been produced by the source pulse of neutrons interacting with fissionable material associated with the object of interest, if they arrive at the fast response detector within a predetermined time window immediately prior to the arrival of the source neutron pulses.

In another aspect the present disclosure relates to a system for detecting fissionable materials. The system may comprise a neutron pulse generator configured to generate multiple short pulses of neutrons, or a single pulse of sufficient intensity, in a vicinity of an object of interest, and directed at a first side of the object of interest. The multiple source pulses of neutrons each have a full width half maximum time duration of less than about 100 ns. A fast response detector may be included which is arranged remotely from the neutron pulse generator and faces a second side of the object of interest generally longitudinally along a line-of-sight with the neutron pulse generator. The fast response detector is time aligned with the generation of the multiple short pulses of neutrons, and further is configured to detect one or more fission neutrons produced by the source pulse of neutrons interacting with the fissionable material associated with the object of interest, and arriving at the fast response detector within a predetermined time window immediately prior to the arrival of the source neutron pulses.

In still another aspect the present disclosure relates to a method for detecting a presence of a fissionable material associated with an object of interest. The method may comprise generating multiple short pulses of source neutrons, or a single pulse of sufficient intensity, in a vicinity of the object of interest, wherein the source neutrons have a full width half maximum time duration of less than about 100 ns and a peak energy level no greater than about 20 MeV (e.g., the vast majority of the neutrons have energy below 20 MeV). The method may further comprise using a fast response detector able to detect a single neutron event indicative of fission neutrons having been produced when the source neutrons interact with fissionable material associated with the object of interest, and wherein the fast response detector detects the single neutron event within a predetermined time window immediately prior to the arrival of the source neutron pulses.

DRAWINGS

The drawings described herein are for illustrative purposes only of selected embodiments and not all possible implementations and are not intended to limit the scope of the present disclosure. Corresponding reference numerals indicate corresponding parts throughout the several views of the drawings, in which.

Figure 5:
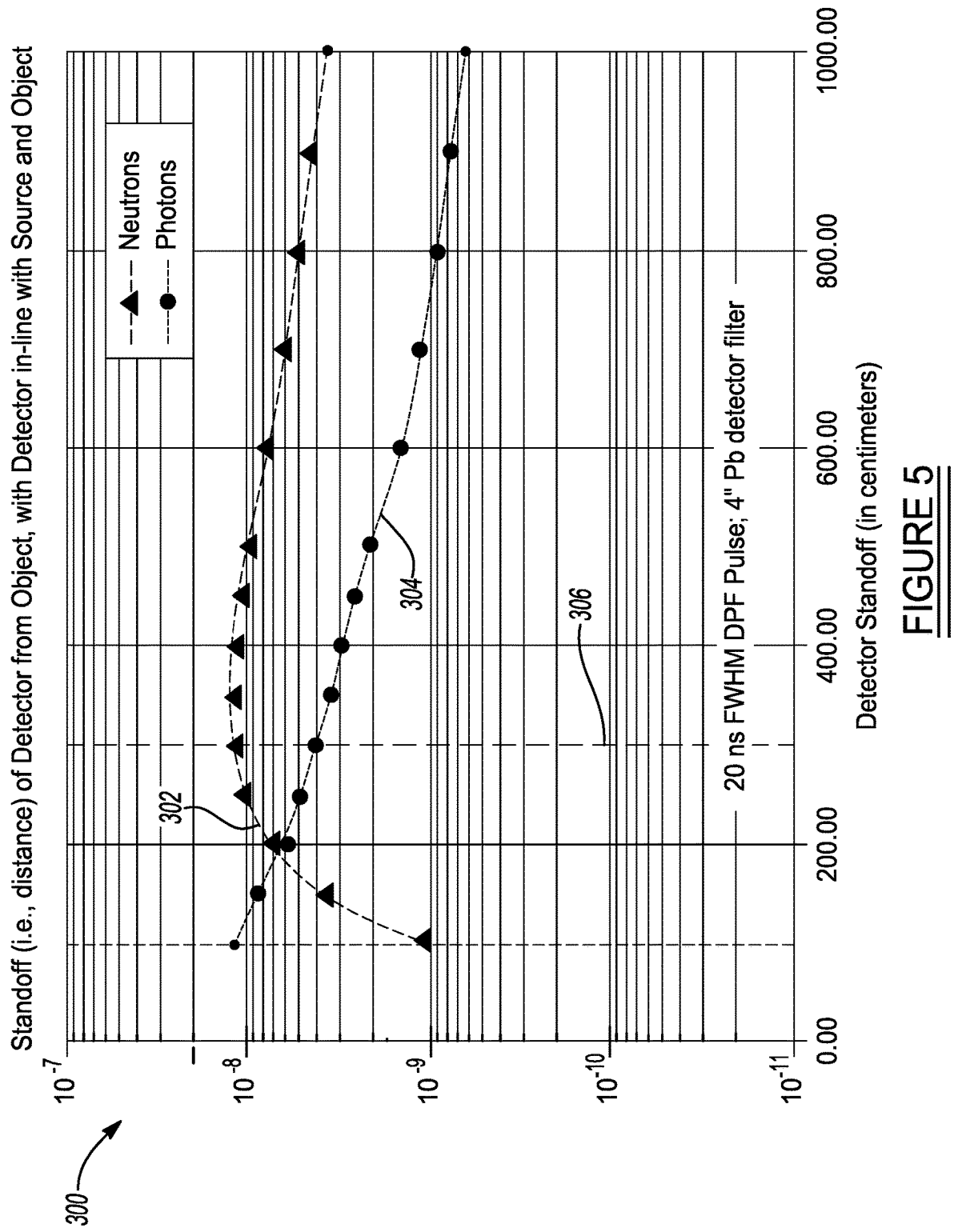
Figure 6:
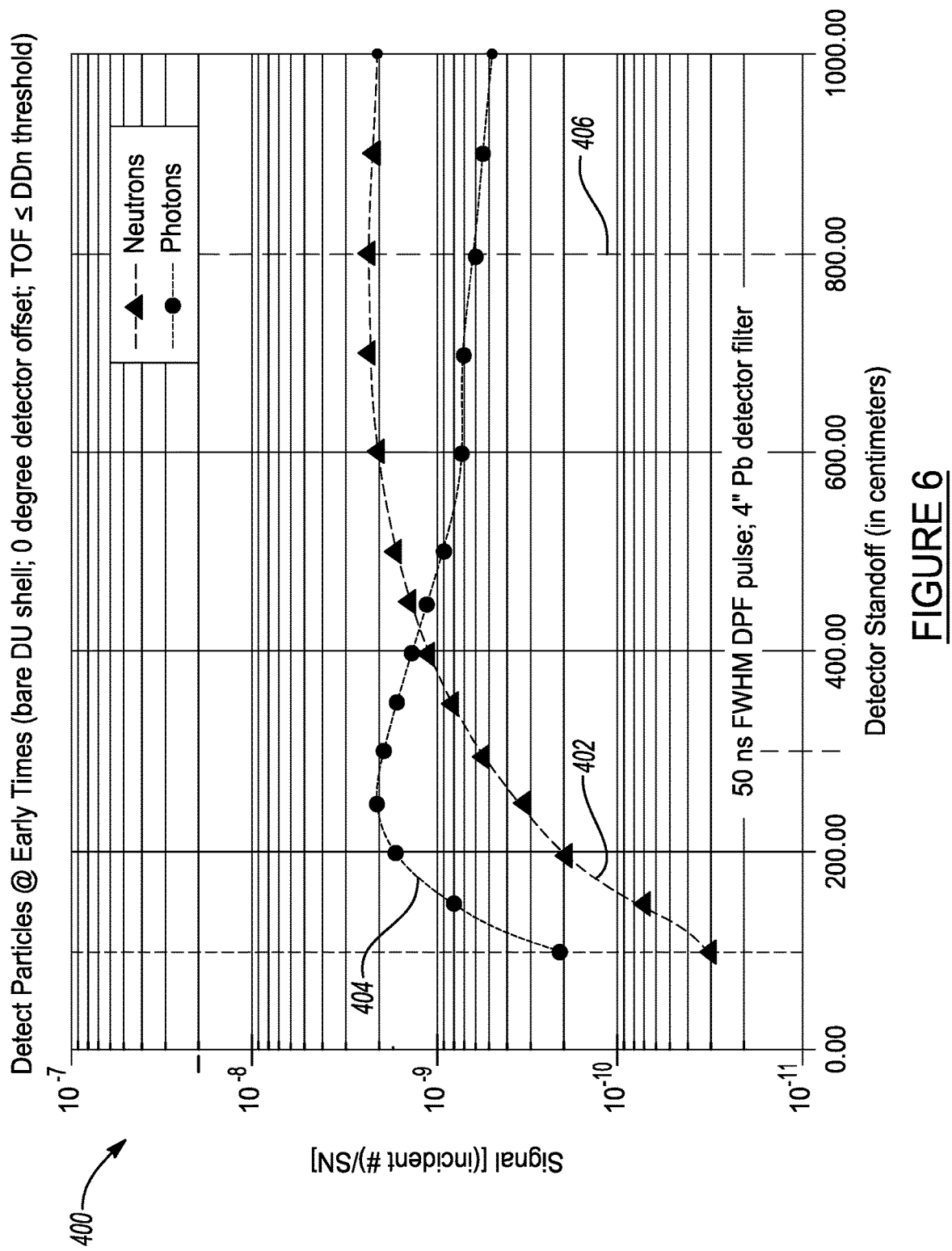

FIG. 5 is a graph showing, for a source emitting 2.45 MeV neutrons (deuterium fusion products) with a 20 ns full width half maximum pulse width, the expected signal (neutrons and photons) at the detector as a function of detector 14 standoff (in centimeters) of the neutrons and photons at 0 degrees, that is, in line with the pulse source and the object, and with no surrounding geometry, and wherein a standoff distance of approximately 300 cm from the object is the ideal detector position; and FIG. 6 shows another graph of a similar configuration (detector in line with the pulse source and the object, and at 0 degrees) but with a 50 ns pulse full width half maximum, and here the ideal detector distance is instead 800 cm from the object.

DETAILED DESCRIPTION

Example embodiments will now be described more fully with reference to the accompanying drawings.

The present disclosure is directed to a method for reliably and quickly detecting the presence of fissionable material, without the limitations of existing methods which have previously been used for this purpose. Initially, a monoenergetic or quasi-monoenergetic pulsed neutron source device is used to produce multiple neutron pulses, or a single pulse of sufficient intensity. In both cases, the sources turn on very quickly, within tens of nanoseconds. The simplest incarnation of a fast-turn-on pulse is an intense short pulse (e.g., <100 ns Full Width Half Maximum). For a sufficiently bright neutron source, the measurement could be made with a single pulse.

It will be appreciated that no neutron source is truly monoenergetic. Even the Dense Plasma Focus ("DPF") generator, which was used at Lawrence Livermore National Laboratory as the source neutron generator for the system and method of the present disclosure, is not truly monoenergetic, as there is some thermal spread in the neutrons it produces. Additionally, one could have a neutron source, such as a deuterium-tritium source, which would emit neutrons at 14 MeV mostly, but also have a smaller population at mean energy of 2.45 MeV. In the strictest sense, this is not monoenergetic, but such a neutron source would still work satisfactorily as the neutron generator for the present system and method. Accordingly, for the following discussion, the term "quasi-monoenergetic" neutron source will be used, and this term is meant to encompass any neutron source which is capable of generating a pulse of neutrons with the vast majority of the neutrons having one energy with a relatively narrow energy spread around it (e.g., $\Delta E/E<0.5$). For the purposes of this disclosure, a low energy tail would be an acceptable deviation from this, since those neutrons would not contaminate the measurement. As noted above, in one preferred form the pulse source may be the Dense Plasma Focus ("DPF") generator used to demonstrate this method at Lawrence Livermore National Laboratory. The DPF generator is a kilojoule scale device which produces a <50 ns neutron pulse, generates approximately $1\times10^7$ neutrons/pulse yield, has approximately a 200-liter volume, and weighs approximately 200 kg, although it is expected that these dimensions can likely be reduced with minor modifications to about less than 80 liters in volume and 50 kg in total weight. The DPF is a Z-pinch like device which takes advantage of a plasma instability to create a high-intensity, short pulse (<100 ns Full Width Half Maximum) of neutrons with no dark current. Other possible pulse sources, for example and without limitation, may be a Z-pinch system or a laser-based neutron source.

With the present system and method, rather than relying on delayed neutrons for the identification, the system and method relies on detection of a neutron signal arriving prior to the signal induced by the un-scattered source neutrons. By using this early signal, the scattered signal does not affect the measurement and, thus, the identification is independent of moderating materials in the room, such as the floor, wall, or shielding placed over the fissionable material. Furthermore, typically short-pulse neutron generators, including DPF, Z-pinch or laser-based generators, do not exhibit "dark current", which is a low level of neutrons emitted while the generator is off. This makes the early neutron pulses easier to differentiate. Finally, the short pulse interrogation signal approach does not remove the possibility of using active gamma spectroscopy or differential die-away, if other measurements are desired using the same interrogation source.

This technique provides a new way to detect fissionable material. The components include a neutron source and fast detectors that can be deployed around an object of interest.

Figure 1:
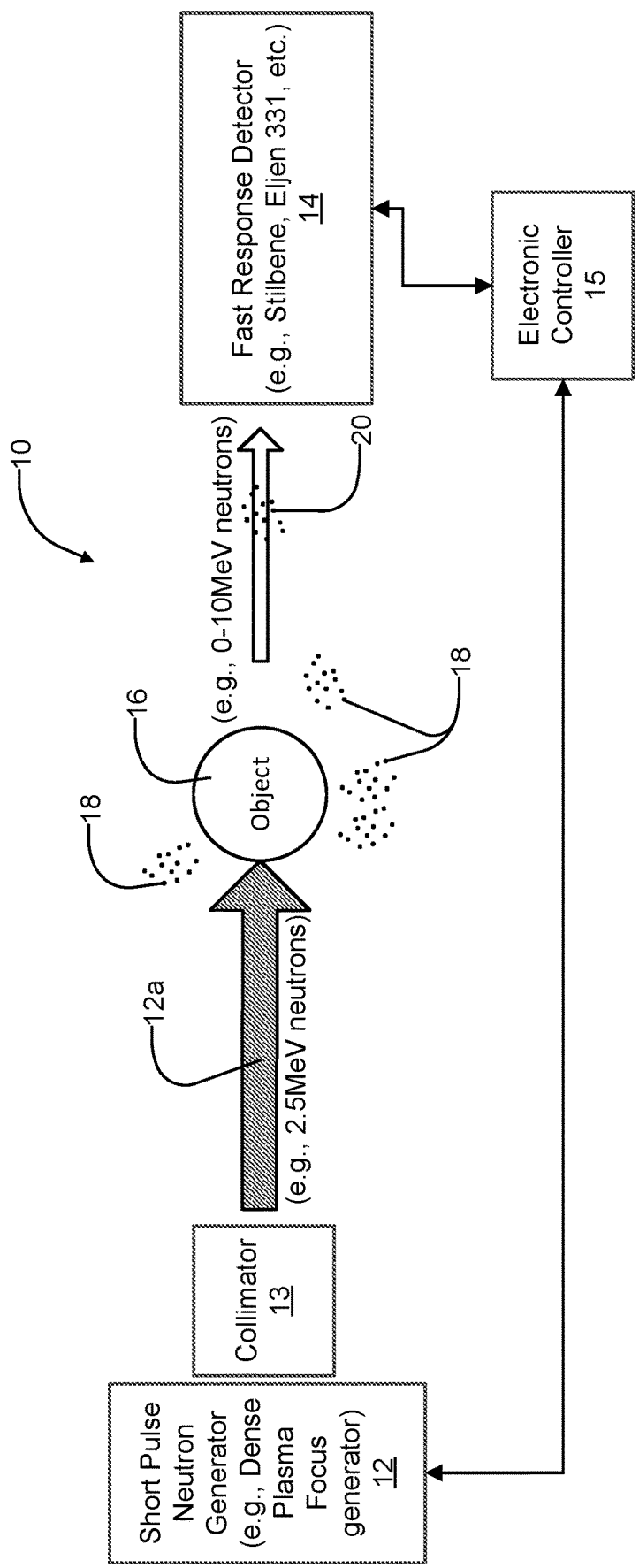
FIG. 1 is a schematic view of one embodiment of a system in accordance with the present disclosure.

Referring to FIG. 1, one example of a fast fissionable material detection system 10 (hereinafter simply "system 10") is shown. The system 10 in this example includes a short pulse neutron generator 12 (hereinafter simply "pulse generator" 12) and a fast response detector 14. An electronic controller 15 may also be incorporated to control the fast response detector 14 and/or the pulse generator 12.

The pulse generator 12 in one preferred form may be the DPF generator as noted above, or alternatively the pulse generator 12 may comprise a Z-pinch generator or laser-based generator, or any other suitable form of short neutron pulse generator. For the purpose of the following discussion, it will be assumed that the pulse generator 12 is the DPF generator described above. Preferably, the pulse generator 12 emits short, relatively low energy (e.g., <100 ns at full width half maximum (FWHM) neutrons <20 MeV) pulses. In one specific implementation the pulse generator 12 may be a deuterium-based neutron source that emits neutrons near 2.5 MeV. Multiple pulses can be used to overcome limitations in signal strength from a single pulse, or a single sufficiently bright pulse could be used.

The fast response detector 14 may comprise a fast response neutron detector such as for example, but not limited to, Stilbene (an organic scintillator crystal) or Eljen 331 (a liquid scintillator commercially available from Eljen Technology of Sweetwater, TX). This detector may be run in a way (i.e., with a sufficiently high gain level) as to maximize the signal generated from single neutron observations to optimize this method. Running the detector 14 at this sufficiently high gain level will likely cause the detector signal to saturate when the main pulse from the unscattered source neutrons arrive. The rising edge of this saturated signal may be used as a timing fiducial for arrival of source neutrons. Multiple detectors may be used with different gain settings in order to properly allow for timing alignment among multiple neutron pulses or to maintain data integrity when a single intense pulse is used.

In operation, the pulse generator 12 is placed in the vicinity of an object of interest (e.g., typically within about 1-50 meters, or possibly even further). The pulse generator 12 emits neutrons below a given energy threshold, for example <10 MeV, and more preferably neutrons near 2.5 MeV. The fast response detector 14 is also placed in the vicinity of the object of interest (e.g., typically within about 1-50 meters, or possibly even further from the object of interest; a discussion of an optimal placement location for the detector 14 is provided in the following paragraphs). The pulse generator 12 emits a short interrogation pulse 12a (<100 ns FWHM) of neutrons at mean energy preferably significantly below 10 MeV, which can interrogate an object of interest 16 as shown in FIG. 1. Importantly, the pulse generator 12 does not emit a significant number of neutrons prior to the onset of this short interrogation pulse.

Once the interrogation pulse 12a is generated, the neutrons then impact the object of interest 16. If the object of interest 16 contains only non-fissionable material, the neutrons scatter from the object of interest 16, as indicated in highly simplified form by source neutrons 18, and form a characteristic die-away signal as measured by the fast response detector 14, the signal from which may be recorded by a sufficiently high-bandwidth digitizer or oscilloscope. If there is fissionable material in the object of interest 16, the source neutrons 18 induce prompt fission events (i.e., create fission neutrons). These events have a characteristic energy spectrum which has a high energy tail up to approximately 20 MeV (maximum energy level), or possibly even higher. The higher energy neutrons, indicated in highly representative form in FIG. 1 by reference number 20, have speeds significantly in excess of the lower energy neutrons from the pulse generator 12. Thus, the fast response detector 14 detects a small but significant number of these high energy neutrons 20 arriving before the source neutrons 18 are able to reach it. These "early arrival fission neutrons" are a characteristic signal of the presence of fissionable material in the object of interest 16 and thus provide a binary detection mechanism for the presence of fissionable materials. The fast response detector 14 may preferably be operated in a mode where multiple neutron events may be detected within a short time window. Several modes of operation can be used for the detectors. It may be desirable to put the fast response detector in line with the axis created by the source and object. This is the location with the most fission signal. However, depending on what source is used, it may be desirable to place the fast response detector at an angle (generally between 0 and 90° depending on the source geometry) relative to this axis. This allows for shielding of the detector from x-rays or gammas that some sources emit, and may arrive at the detector prior to the fission-induced neutrons, without shielding the direct line-of-sight from the object to the detector. Additionally, it may be desirable to use a collimator, such as optional collimator 13 shown in FIG. 1, which forms a shaped structure used to shield radiation from certain lines of sight to the object of interest 16, to thus minimize the number of stray neutrons from the source pulse generator 12 that are emitted at angles such that they would not intersect the object of interest. It may be desirable to place the detector 14 in the shadow of the collimator 13.

One advantageous mode of operation is the use of multiple detectors, set at different gains, so that some detectors can detect single pulses from the source while other detectors are set to avoid potential saturation. Secondary detectors can also be used to establish the timing of the neutron pulse and thus the time window in which to look for early arriving fission neutrons. In single pulse-counting mode, there are some fast detectors which can distinguish between photons and neutrons by pulse shape. Such detectors may be used to eliminate "false positives" in the form of x-rays/gammas originating from the neutron source or object of interest.

Given the importance of precise timing to properly identify the fission neutrons, particularly when multiple source pulses are used, an electronic pulse generator (for example, a Stanford Research Systems DG 535) can be used to temporally align the source and detector. Given potential uncertainties in the exact timing of the source emission, this alignment can further be refined by analyzing the steep rise of the source neutron arrival (150a in FIG. 3). Alternatively, if the source emits X-ray pulses coincident with the neutron pulse, these may also be used as a timing fiducial as well.

Figure 2:
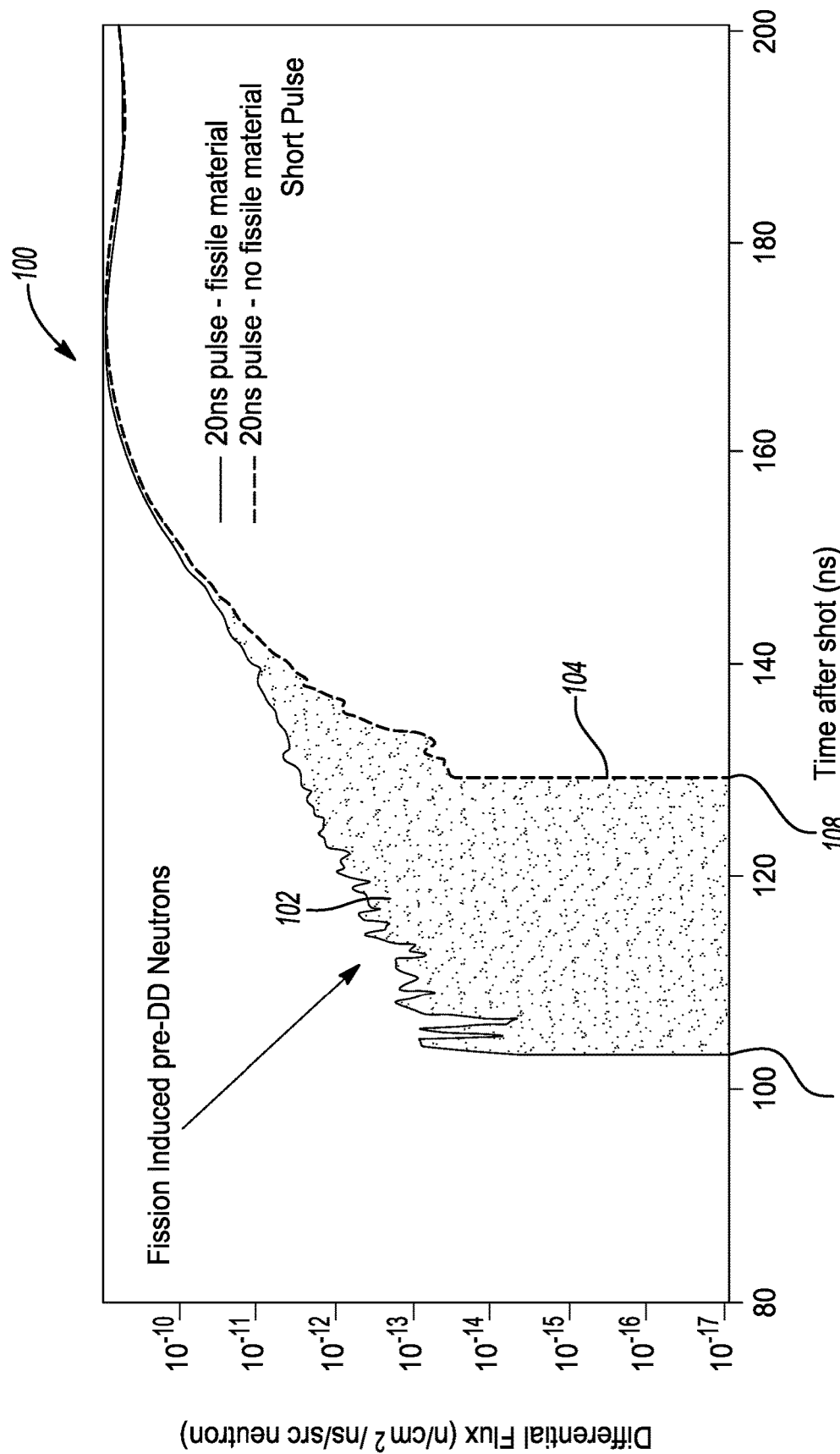
FIG. 2 shows a Monte Carlo N-particle (MCNP) simulation of the system operation for two unique scenarios, illustrating how the arrival of the fission neutrons induced at the object of interest is detected well before the scattered source neutrons.

FIG. 2 shows a graph 100 example modeling of a short pulse source incident on a fissionable and non-fissionable material (i.e., two unique scenarios). The portion of fission neutrons produced are indicated by portion 102 (i.e., when fissionable material is present in the object of interest 16). The source neutrons are indicated by number 104. Note the detection of the fission neutrons 102 begins at about the 105 ns mark (point 106 on the graph), which is well before the detection of the source neutrons 104 (beginning at about 130 ns, indicated by point 108 on the graph) which have not interacted with the fissionable material. It is notable that while fractional neutrons are predicted in the modeling, observed neutrons would be observed as binary impacts, so statistics may be built over numerous discharges.

Figure 3:
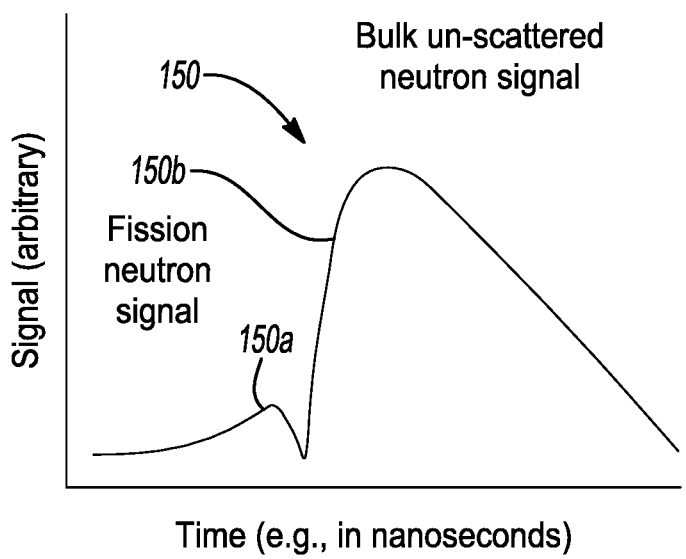
FIG. 3 is a graph showing an example of an early arrival fission neutron in time as compared to un-scattered neutrons.

FIG. 3 further illustrates a waveform 150 in which portion 150a represents the detection of at least one fission neutron, while portion 150*b* represents the reception of the un-scattered neutrons at a point later in time. It is notable that the early event can be a single neutron impact, while the later peak represents the many overlapping arrivals of source neutrons, commonly referred to as "pile-up".

This short pulse approach offers multiple benefits. The shortest path from the source to the fast response detector 14 determines the bound on the un-scattered detection timing. Since any neutron that is scattered in the room or goes straight to the detector without scattering will arrive after the high-energy fission neutrons, it will, thus, not contaminate the measurement being made by the fast response detector 14.

Furthermore, in contrast to die-away measurement techniques, the fast measurement for fission neutrons is not affected by other materials in the environment (e.g., container, room, etc.), for example wood, lead, steel, iron, plastic, vermiculite, dirt, etc., where the object of interest is located, or in which the object of interest is enclosed or encased. Advantageously, the short pulse used by the system 10 does not preclude the analyses from systems employing the die-away analysis, radiography, or gamma-ray spectroscopy.

One potential complication might include induced gamma rays from the object of interest, which will arrive at the fast response detector 14 before the source neutrons, and therefore could be misinterpreted as fast fission neutrons. Their number, however, is expected to be low, and they can be discriminated on sufficiently fast time scales. Additionally, the fast response detector 14 can be shielded such that it is not exposed to source gamma rays.

Figure 4:
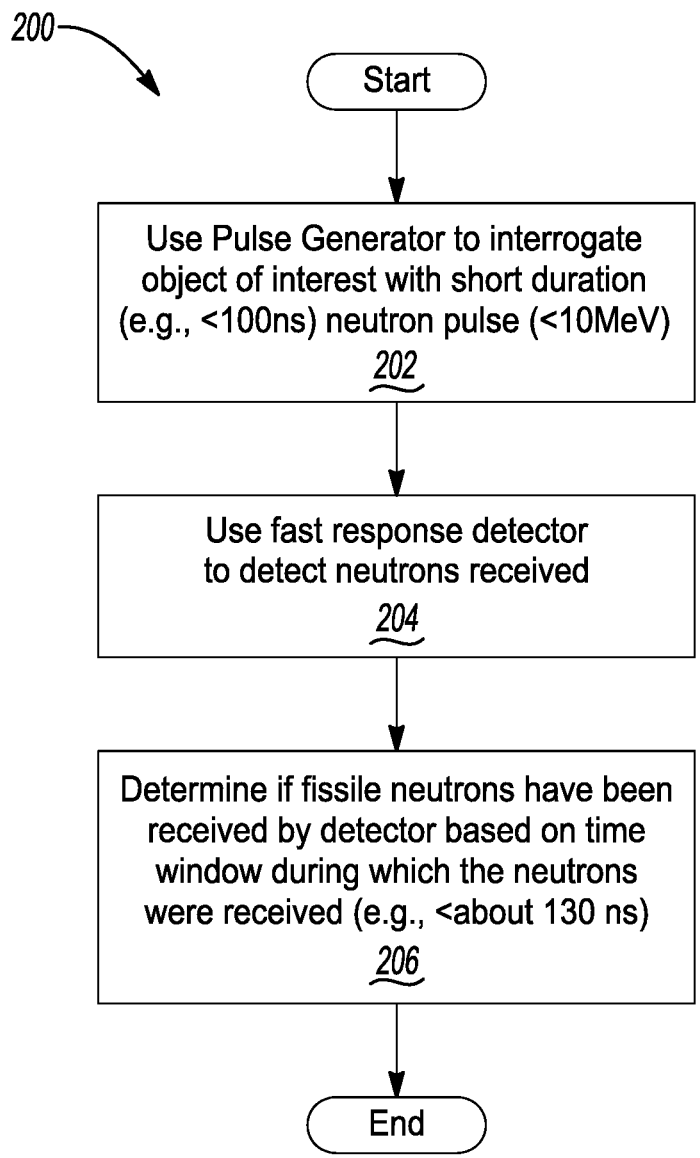
FIG. 4 is a high-level flowchart setting forth various operations that may be performed by a system in accordance with the present disclosure.

Referring briefly to FIG. 4, a flowchart 200 is shown setting forth a plurality of operations that may be performed by the system 10 during its use. At operation 202, the pulse generator 12 generates an interrogation source pulse in the vicinity of the object of interest 16. At operation 204 the fast response detector 14 is used to detect the arrival of neutrons subsequent to generation of the source pulse. The fast response detector 14 may determine the presence of fission neutrons, as indicated at operation 206, based on the arrival time of the detected neutrons, with neutrons arriving within an initial predetermined time window that depends on the source neutron energy and the distant from the source to the detector (e.g., within about 130 ns of generation of the source pulse) indicating the presence of fission neutrons.

It will also be appreciated that the position of the detector(s) 14 has a strong effect on both the early neutron and early gamma signal, which sets an optimal location to place the detector(s) relative to the neutron source pulse generator 12 and the object 16 for the method. For the gamma rays, as the detector(s) 14 is/are moved further away from the object 16, the early signal falls off as $1/r^2$ due to decreasing flux rates. These gamma rays are formed from the neutrons interacting with the source pulse generator 12 surrounding geometry, so the further back the detector(s) 14 is/are moved, the cleaner the signal will appear from the neutronics perspective. To avoid confusion with respect to the signal being detected by the detector(s) 14, the further back that the system is placed, the cleaner the detected signal will appear at the detector(s) 14.

For the neutrons, there is a tradeoff in position. While the signal induced from the object 16 falls off as $1/r2$ just as the photons, as the detector(s) 14 is/are moved further back more and more, the high energy neutrons created by the fission spectrum (often represented by the Watt spectrum) can be detected more reliably. This effect is due to the short pulse neutron source 12 having a non-infinitesimal width, and the high energy neutrons from fission reactions in the object 16 being created in proportion to the flux at the object 16. Fission neutrons created at the peak of the source pulse can arrive before the rising edge of source width if the distance from the object 16 to the detector (s) 14 is long enough to allow those higher energy neutrons to make up for the time difference in the arrival of the rising edge of the un-scattered source pulse. The further the distance between the object and the detector, the more effective time there is for high energy neutrons to "catch up" to the unscattered neutrons from the source pulse. This effect increases the total number of neutrons available in the early arrival time frame and can be a significant improvement in obtaining a clean, reliable signal at the detector(s), and thus in significantly improving the functionality of the system 10 and its corresponding method.

By balancing the drop-off of the flux from $1/r^2$ and the increase in early arrival signal, there will thus be an optimal distance to place the detectors to maximize the early arrival neutron signal. It is notable that this distance does not balance an increase in neutron signal versus a decrease in gamma signal, rather, it in fact is the location where the neutron signal itself is maximized. It may, in some situations, be prudent to go beyond this distance if the gamma signal appears to be affecting the neutron signal excessively. However, under most circumstances, the optimal position (i.e., distance of detector(s) 14 from the object 16) will be the location of maximum early neutron flux.

For example, for a source emitting 2.45 MeV neutrons (generated by deuterium fusion) with a 20 ns full width half maximum, FIG. 5 shows a graph 300 with the expected signal as a function of detector 14 standoff of the neutrons (curve 302) and photons (curve 304) at 0 degrees, that is, in line with the pulse source 12 and the object 16, and with no surrounding geometry. For this set-up, therefore approximately 300 cm from the object 16 is the ideal detector 14 position, as indicated by dashed line 306. FIG. 6 shows another graph 400 of a similar configuration (detector in line with the pulse source and the object, and at 0 degrees) but with a 50 ns pulse full width half maximum, and where the neutrons are indicated by curve 402 and the photons by curve 404. Here the ideal detector distance is instead 800 cm from the object, as indicated by dashed line 406.

The system 10 and method of the present disclosure thus combines the use of a short pulse neutron source with the use of a fast response detector, in a unique and heretofore unexplored manner. The system 10 advantageously searches for a signal during a short, predetermined time, during which only fission neutrons would be received from an object of interest which has just been interrogated with source neutrons of a desired energy level and duration from a neutron pulse generator.

Focusing on this short duration time-window prior to the source neutron pulse, is an operation which has not been observed previously in practice. It is possible that no previous attempts to exploit the detection of fast fission neutrons from an object of interest is due to the vast majority of commercial neutron sources being longer pulse (>1 µs) accelerator-based sources. Such longer pulse, accelerator-based pulse sources cause this measurement for fast fission neutrons to be virtually indistinguishable in timing from neutrons generated by the source. Additionally, most commercially available generators exhibit "dark current" (a small number of neutrons being emitted during the "off" period), which makes the measurement of early arrival fission neutrons unfeasible, even if the small signal levels could be detected. Lower Technology Readiness Level ("TRL") and less rugged short-pulse neutron generators have largely remained outside of the active interrogation community, because they are typically not turn-key devices. Also, the much higher fluxes from these short-pulse generators may make it desirable to run centimeter-sized scintillator detectors in "current mode", in which multiple pulses from individual detection events may overlap in time. Running in current mode, however, has the disadvantage of lowering the observed signal level for individual pulses. This issue could be side-stepped by fielding a large array comprising smaller scintillators, sized to only receive a single pulse within a set time window. This issue can also be remedied in this approach by taking multiple pulses with the source at lower intensity and with higher gain on the detectors.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for detecting fissionable materials, comprising:
   a neutron source pulse generator configured to generate single neutron events by creating multiple short source pulses of neutrons, or a single source pulse of neutrons, of a predetermined intensity, in a vicinity of an object of interest having fissionable material, to thus create the single neutron events as the multiple short source pulses of neutrons, or the single source pulse, interact with the fissionable material, the single neutron events representing fission neutrons;
   the source pulse or source pulses of neutrons including neutrons which each have a full width half maximum time duration of less than about 100 ns and a peak energy level no greater than about 20 MeV;
   a fast response detector configured with a predetermined fast neutron time detection window to detect the single neutron events occurring from creation of the multiple source pulses or the single source pulse of neutrons, the fission neutrons having been produced by the source pulse or source pulses of neutrons interacting with fissionable material associated with the object of interest, within the predetermined fast neutron time detection window, immediately prior to arrival of the source pulse neutrons; and
   wherein the full width half maximum time duration of the neutron source pulse generator is further configured in relation to a distance separating the fast response detector from the target, to optimize a flux of the fission neutrons detected by the fast response detector.

2. The system of claim 1, wherein the mean energy level of the short pulses of neutrons comprises an energy level of about 2.5 MeV.

3. The system of claim 1, wherein the fast response detector comprises an organic scintillator.

4. The system of claim 1, wherein the fast response detector comprises a plurality of detectors having different gain settings.

5. The system of claim 4, wherein one of the plurality of detectors is configured to act as a secondary detector to establish a timing of the short duration neutron pulses generated by the neutron pulse generator.

6. The system of claim 1, wherein the neutron pulse generator comprises a dense plasma focus generator.

7. The system of claim 1, wherein the fast response detector is configured to detect multiple neutron events within a given time window.

8. The system of claim 1, wherein the fast response detector is arranged along a direct line-of-sight with the neutron pulse generator.

9. The system of claim 1, wherein the fast response detector is arranged in line with the neutron pulse generator and the object, and at a standoff distance from the object, to maximize the flux of the fission neutrons detected at the fast response detector.

10. The system of claim 1, wherein the fast response detector comprises a liquid scintillator.

11. The system of claim 1, wherein the neutron pulse generator comprises a laser-based generator.

* * * * *